United States Patent
Arai

(10) Patent No.: US 10,222,606 B2
(45) Date of Patent: Mar. 5, 2019

(54) TELESCOPIC OPTICAL SYSTEM AND OPTICAL APPARATUS

(71) Applicant: Nikon Corporation, Chiyoda-ku, Tokyo (JP)

(72) Inventor: Satoshi Arai, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 14/373,898

(22) PCT Filed: Jan. 18, 2013

(86) PCT No.: PCT/JP2013/050940
§ 371 (c)(1),
(2) Date: Jul. 22, 2014

(87) PCT Pub. No.: WO2013/111683
PCT Pub. Date: Jan. 8, 2013

(65) Prior Publication Data
US 2014/0368905 A1   Dec. 18, 2014

(30) Foreign Application Priority Data

Jan. 23, 2012 (JP) ................................ 2012-010642

(51) Int. Cl.
*G02B 23/00* (2006.01)
*G02B 23/02* (2006.01)
(Continued)

(52) U.S. Cl.
CPC .......... *G02B 23/02* (2013.01); *G02B 17/026* (2013.01); *G02B 27/646* (2013.01)

(58) Field of Classification Search
CPC .... G02B 5/04; G02B 5/0808; G02B 13/0065; G02B 21/04
(Continued)

(56) References Cited

U.S. PATENT DOCUMENTS 4,221,459 A * 9/1980 Fisher ................... G02B 17/08
359/364
5,598,296 A * 1/1997 Imaizumi ............... G02B 15/04
359/421
(Continued)

FOREIGN PATENT DOCUMENTS

JP    10-020211 A    1/1998
JP    3050933 U    8/1998
(Continued)

OTHER PUBLICATIONS

International Search Report from International Patent Application No. PCT/JP2013/050940, dated Apr. 23, 2013.
(Continued)

*Primary Examiner* — Stephone B Allen
*Assistant Examiner* — Travis Fissel
(74) *Attorney, Agent, or Firm* — Shapiro, Gabor, Rosenberger, PLLC

(57) ABSTRACT

A telescopic optical system that can be compact and lightweight is provided, and an optical apparatus including the telescopic optical system is also provided. A telescopic optical system 10, which is used in a telescope and other optical apparatus, includes the following optical systems arranged from an object side: an objective optical system 1; and an erecting optical system 2, which erects an image formed by the objective optical system 1, and the erecting optical system 2 includes a first reflection mirror 22, which is a first reflection member and has a reflection surface that reflects light from the objective optical system 1, a second reflection mirror 23, which is a second reflection member and has a reflection surface that reflects the light reflected off the first reflection mirror 22, and a roof prism 25, which is a third reflection member, has at least three surfaces including at least one roof surface, uses one of the surfaces as a light incident surface and another one of the surfaces as a
(Continued)

light exiting surface, and causes the light reflected off the second reflection mirror 23 to be incident through the light incident surface, to be reflected off the surfaces, and then to exit through the light exiting surface.

16 Claims, 7 Drawing Sheets

(51) Int. Cl.
  *G02B 17/02* (2006.01)
  *G02B 27/64* (2006.01)
(58) Field of Classification Search
  USPC ........ 359/399, 406, 419, 726, 835, 836, 865
  See application file for complete search history.

(56) References Cited

U.S. PATENT DOCUMENTS

| | | |
|---|---|---|
| 6,188,516 B1 | 2/2001 | Watanabe |
| 7,961,386 B2 * | 6/2011 | Danziger ............. B64G 1/1021 244/158.4 |
| 8,194,318 B2 * | 6/2012 | Yamada ................. G02B 13/02 359/399 |
| 2003/0142404 A1 | 7/2003 | Nagatoshi |
| 2003/0169516 A1 | 9/2003 | Sekiyama |
| 2009/0091821 A1 * | 4/2009 | Regan .................... G02B 5/208 359/351 |
| 2010/0302640 A1 * | 12/2010 | Take .................... G02B 15/173 359/557 |

FOREIGN PATENT DOCUMENTS

| | | | | |
|---|---|---|---|---|
| JP | 2003-222802 A | | 8/2003 | |
| JP | 2003-228003 A | | 8/2003 | |
| JP | 2009-002991 A | | 1/2009 | |
| JP | 2009002991 A | * | 1/2009 | ............. G02B 15/20 |
| JP | 2009-002991 A | * | 8/2009 | ............. G02B 15/20 |
| JP | 2010-039339 A | | 2/2010 | |

OTHER PUBLICATIONS

International Preliminary Report on Patentability from International Application No. PCT/JP2013/050940, dated Jul. 29, 2014.

* cited by examiner

TELESCOPIC OPTICAL SYSTEM AND OPTICAL APPARATUS

TECHNICAL FIELD

The present invention relates to a telescopic optical system and an optical apparatus.

BACKGROUND ART

In recent years, a telescope and binoculars are required to be compact and lightweight. On the other hand, since a bright optical system is also required, the objective aperture of an optical system tends to be larger. Further, to correct paraxial chromatic aberrations, an objective lens is, for example, made of an anomalous dispersion glass material having large specific gravity, which prevents a compact and lightweight apparatus from being achieved. To address the problem, a proposal has been made to use an erecting optical system in which a glass prism, which is heavy, is replaced with mirrors for reflection (see Patent Literature 1, for example).

CITATION LIST

Patent Literature

Patent Literature 1: Japanese Patent Laid-Open No. 2003-222802

SUMMARY OF INVENTION

Technical Problem

Although replacing part of the reflection surfaces that form a glass prism with flat mirrors allows reduction in the weight of an entire optical system, inappropriate positional arrangement of the optical members undesirably prevents desired specifications from being achieved with the optical system maintained compact and lightweight.

The present invention has been made in view of the problem described above, and an object of the present invention is to provide a telescopic optical system that can be compact and lightweight and an optical apparatus including the telescopic optical system.

Solution to Problem

To solve the problem described above, a telescopic optical system according to the present invention includes the following optical systems arranged from an object side: an objective optical system; and an erecting optical system that erects an image formed by the objective optical system, and the erecting optical system includes a first reflection member having a reflection surface that reflects light from the objective optical system, a second reflection member having a reflection surface that reflects the light reflected off the first reflection member, and a third reflection member that has at least three surfaces including at least one roof surface, uses one of the surfaces as a light incident surface and another one of the surfaces as a light exiting surface, and causes the light reflected off the second reflection member to be incident through the light incident surface, to be reflected off the surfaces, and then to exit through the light exiting surface.

In the telescopic optical system described above, a condition defined by the following expression is preferably satisfied:

$$(\Phi_1 + \Phi_2) \cdot \cos \alpha < L \qquad \text{[Expression 1]}$$

where $\Phi_1$ represents an effective diameter of the first reflection member, specifically, an effective diameter thereof in a longitudinal direction, $\Phi_2$ represents an effective diameter of the light incident surface of the third reflection member, $\alpha$ represent an angle that the reflection surface of the first reflection member forms with an optical axis, and L represents a spacing between an end of the reflection surface of the first reflection member that faces the objective optical system and the light exiting surface of the third reflection member.

In the telescopic optical system described above, a condition defined by the following expression is preferably satisfied:

$$0.5 < \frac{d_1}{d_2} < 2 \qquad \text{[Expression 2]}$$
$$\frac{1}{4} f_o < d_1 + d_2 < \frac{3}{4} f_0$$

where $f_0$ represents a focal length of the objective optical system, $d_1$ represents a distance along an optical axis from the reflection surface of the first reflection member to the reflection surface of the second reflection member, and $d_2$ represents a distance along the optical axis from the reflection surface of the second reflection member to the light incident surface of the third reflection member.

In the telescopic optical system described above, a condition defined by the following expression is preferably satisfied:

$$z_0 - (d_1 + d_2) < d < z_0 \qquad \text{[Expression 3]}$$

where D represents an aperture diameter of the objective optical system, $2\theta$ represents a maximum angle of view of the objective optical system, $f_0$ represents a focal length of the objective optical system, d represents a distance along an optical axis from a principal plane of the objective optical system to the reflection surface of the first reflection member, $d_1$ represents a distance along the optical axis from the reflection surface of the first reflection member to the reflection surface of the second reflection member, and $d_2$ represents a distance along the optical axis from the reflection surface of the second reflection member to the light incident surface of the third reflection member, and $z_0$ is expressed by the following expression.

$$z_0 = \frac{D}{2\tan(\theta) + \dfrac{D}{f_o}} \qquad \text{[Expression 4]}$$

In the telescopic optical system described above, one of the first reflection member and the second reflection member preferably rotates around a center of rotation including an optical axis.

The telescopic optical system described above preferably further includes an ocular optical system for observation of the image formed by the objective optical system, and a condition defined by the following expression is satisfied.

$$\frac{1}{2}\tan^{-1}\left(\frac{f_o - 2f_e}{M}\tan\varepsilon\right) < \delta < \frac{1}{2}\tan^{-1}\left(\frac{f_o}{M}\tan\varepsilon\right) \qquad \text{[Expression 5]}$$

where M represents a distance along the optical axis from the center of rotation of the first reflection member or the second reflection member to the image formed by the objective optical system, $f_o$ represent a focal length of the objective optical system, $f_e$ represent a focal length of the ocular optical system, ε represents inclination of the entire telescopic optical system to the optical axis in a reference state, and δ represents an angle of rotation of the first reflection member or the second reflection member.

The telescopic optical system described above can be so configured that an optical axis of the objective optical system and an optical axis of the ocular optical system are not present along a single straight line.

An optical apparatus according to the present invention is characterized in that the optical apparatus includes any of the telescopic optical systems described above.

Advantageous Effects of Invention

A telescopic optical system that can be compact and lightweight and an optical apparatus including the telescopic optical system can be provided by configuring the present invention as described above.

DESCRIPTION OF EMBODIMENTS

A preferable embodiment of the present invention will be described below with reference to the drawings. A description will first be made of the configuration of a telescopic optical system 10 provided in a telescope, a field scope, binoculars, and other optical apparatus with reference to FIG. 1. The telescopic optical system 10 is formed of the following optical systems sequentially arranged from the object side along an optical axis: an objective optical system 1, which collects light from an object and forms an image of the object; an erecting optical system 2, which converts the inverted image of the object formed by the objective optical system 1 into an erect image by reversing the upper and lower sides and the right and left sides of the inverted image; and an ocular optical system 3, which enlarges the image of the object formed by the objective optical system 1 and allows observation of the enlarged image with an observer's eye positioned at an eye point EP.

Figure 1:
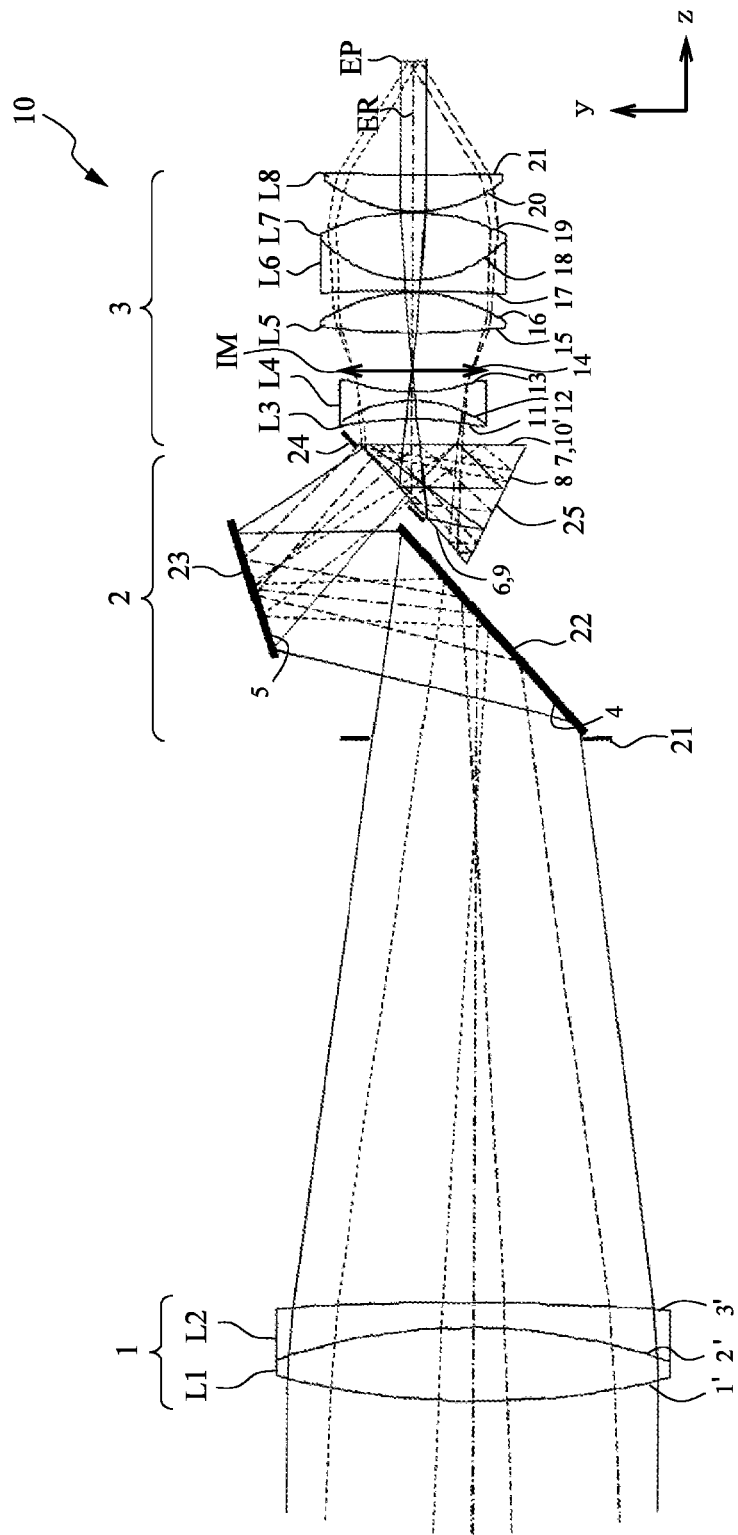
FIG. 1 is a descriptive diagram for describing the configuration of a telescopic optical system.
Figure 2:
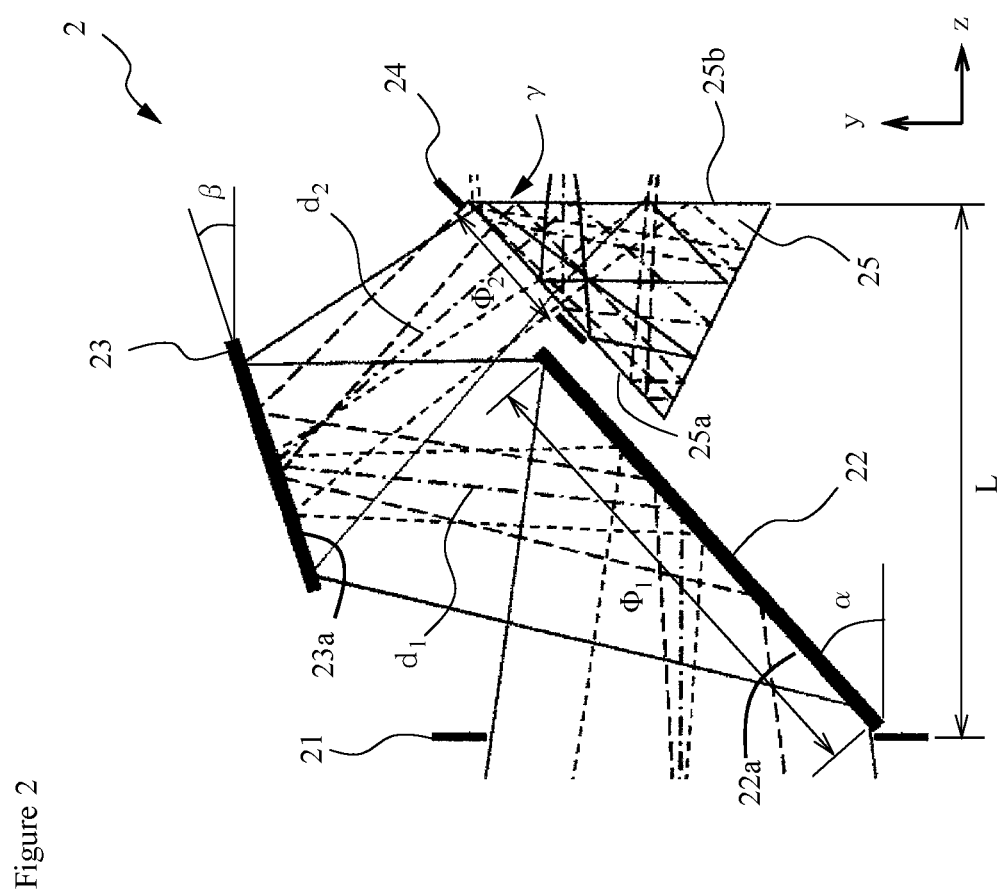
FIG. 2 is a descriptive diagram for describing the configuration of an erecting optical system that forms the telescopic optical system described above.

The erecting optical system 2 used in the telescopic optical system 10 according to the present embodiment includes the following components sequentially arranged from the object side along an optical axis: a first aperture 21; a first reflection mirror 22, which is a reflection member and has a reflection surface 22a; a second reflection mirror 23, which is a reflection member and has a reflection surface 23a; a second aperture 24; and a roof prism 25, which is a third reflection member and has at least three surfaces including at least one roof surface. In the present embodiment, the roof prism 25 is assumed to be a glass member but may instead be made of a resin. Further, in the telescopic optical system 10 according to the present embodiment, the optical axis of the ocular optical system 3 is offset (deviated) from the optical axis of the objective optical system 1 so that the optical axes are not present along a single straight line but are substantially parallel to each other, as shown in FIG. 1. In the following description, x, y and z axes are defined as follows: A z axis is a direction in which the optical axis of the objective optical system 1 (or ocular optical system 3) of the telescopic optical system 10 extends; and y and x axes are directions perpendicular to each other in a plane perpendicular to the z axis. It is also assumed that the first and second reflection mirrors 22, 23 are so disposed that they are perpendicular to a yz plane when they are viewed along the x-axis direction, as shown in FIG. 1.

In the thus configured erecting optical system 2, the following angles are defined in a yz plane: α is the angle that the reflection surface 22a of the first reflection mirror 22 forms with the z axis; β is the angle that the reflection surface 23a of the second reflection mirror 23 forms with the z axis; and γ is a vertex angle of the roof prism 25 (angle that roof surface forms). Based on the above definitions, the following expressions (a) and (b) are satisfied (angles are expressed in ° (degrees)).

[Expression 6]

$$\beta = \frac{2}{3}\alpha - 45 \qquad (a)$$

$$\gamma = 90 - \alpha \qquad (b)$$

For example, when α=42°, β=18° and γ=48°. To achieve the function of the two reflection mirrors 22 and 23 by using a glass prism of related art made of a typical glass material having a specific gravity of 2.35 g/cm³, the weight of the glass prism is about 72 g. On the other hand, the two reflection mirrors 22 and 23 described above weigh a few grams. For example, since the weight of a product of binoculars ranges from about 0.5 to 1 kg, using the two reflection mirrors 22 and 23 as in the present embodiment allows weight reduction of about 10% of the entire optical apparatus.

A description will now be made of conditions under which the telescopic optical system 10 described above is achieved. In the telescopic optical system 10 according to the present embodiment, assuming that a light flux collected by the objective optical system 1 has a substantially circular cross-sectional shape, a light flux projected on the reflection surface 22a of the first reflection mirror 22, which is disposed obliquely with respect to the light flux collected by the objective optical system 1, has an elliptical shape, as shown in FIG. 3. Let now $\Phi_1$ be the length of the light flux projected on the reflection surface 22a of the first reflection mirror 22 in the major axis direction of the elliptical shape, that is, an effective diameter of the first reflection mirror 22, $\chi_2$ be the diameter of the opening of the second aperture 24 disposed on the object side of a light incident surface 25a of the roof prism 25, that is, an effective diameter of the light incident surface 25a of the roof prism 25, and L be the spacing between the closest object-side end of the first reflection mirror 22 and a light exiting surface 25b of the roof prism 25. Based on the above definitions, the telescopic optical system 10 according to the present embodiment desirably satisfies the following conditional expression (1). The spacing L described above represents the distance in the z-axis direction from the closest object-side end of the first reflection mirror 22 to the light exiting surface 25b of the roof prism 25, that is, the overall length of the erecting optical system 2.

[Expression 7]

$$(\Phi_1+\Phi_2)\cdot\cos\alpha < L \qquad (1)$$

Figure 3A:
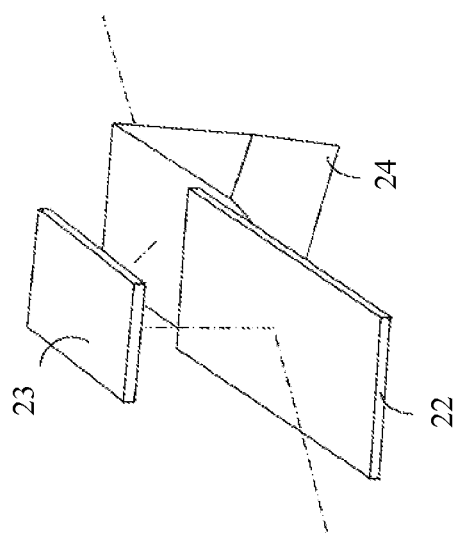
FIG. 3 is a descriptive diagram for describing the relationship between light fluxes in the erecting optical system, FIG. 3(a) showing the relationship among first and second reflection mirrors and a roof prism, FIG. 3(b) showing a case where a light flux reflected off the first reflection mirror and a light flux reflected off the second reflection mirror interfere with each other, FIG. 3(c) showing a case where the light flux reflected off the first reflection mirror and the light flux reflected off the second reflection mirror do not interfere with each other.
Figure 3C:
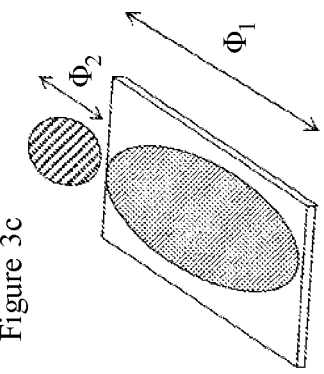
Figure 3B:
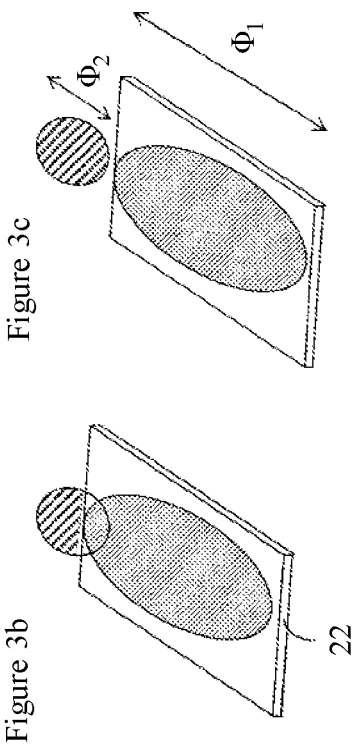

Since rays parallel to the optical axis and incident on the objective optical system 1 are rays that form the pupil of the telescopic optical system 10, the rays should not blocked anywhere in the telescopic optical system 10. In a case where a glass prism of related art is used, the light flux reflected off the first reflection mirror 22 and the light flux reflected off the second reflection mirror 23 may partially overlap with each other without any problem, as shown in FIG. 3(b). In the present embodiment, however, as shown in FIG. 3(a), since the first reflection mirror 22 is present, when the rays reflected off the second reflection mirror 23 are incident on the first reflection mirror 22, the rays are undesirably blocked. To prevent the phenomenon describe above, the lower limit of L, which corresponds to the length of the erecting optical system 2 in the z-axis direction, is set by the conditional expression (1). When the erecting optical system 2 satisfies the conditional expression (1), the light flux reflected off the second reflection mirror 23 is not allowed to be incident on the first reflection mirror 22, as shown in FIG. 3(c).

Further, the telescopic optical system 10 according to the present embodiment desirably satisfies the following conditional expression (2), in which $d_1$ represents the distance along the optical axis from the reflection surface 22a of the first reflection mirror 22 to the reflection surface 23a of the second reflection mirror 23 and $d_2$ represents the distance along the optical axis from the reflection surface 23a of the second reflection mirror 23 to the light incident surface 25a of the roof prism 25.

[Expression 8]

$$0.5 < \frac{d_1}{d_2} < 2 \qquad (2)$$

Figure 4B:
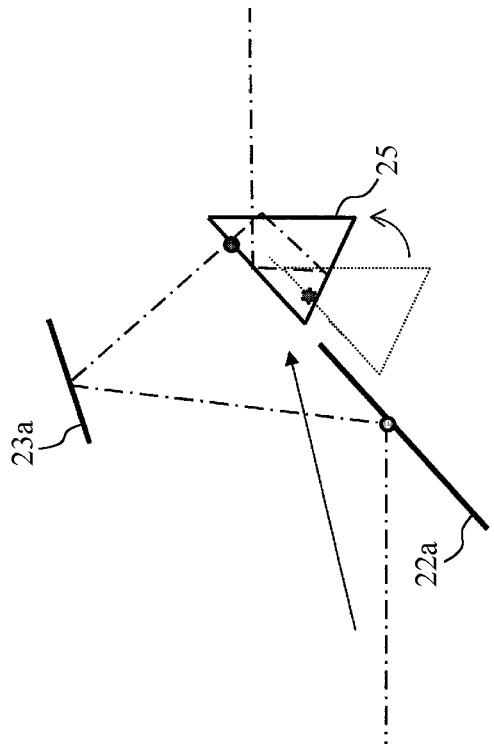
FIG. 4 is a descriptive diagram for describing the positional relationship among the first and second reflections mirrors and the roof prism, FIG. 4(a) showing a basic arrangement thereof, FIG. 4(b) showing a case where an upper limit in a conditional expression is exceeded, and FIG. 4(c) showing a case where a lower limit in the conditional expression is exceeded.
Figure 4C:
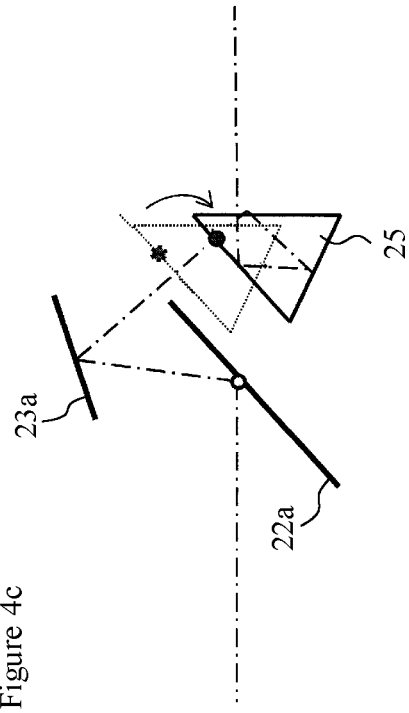
Figure 4A:
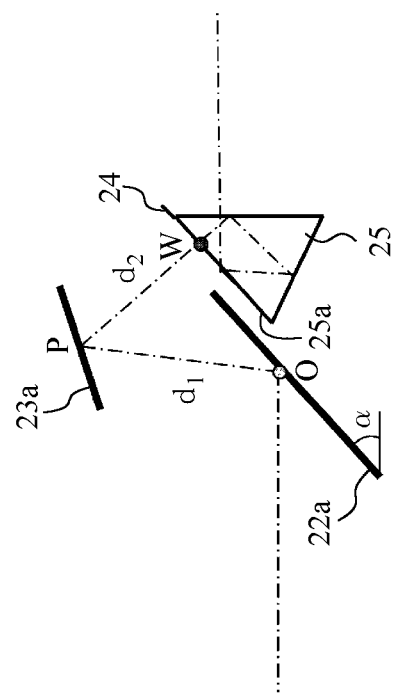

The conditional expression (2) defines a condition under which no stray light is produced in the erecting optical system 2. In FIG. 4(a), let O be a point on the reflection surface 22a of the first reflection mirror 22 where the optical axis intersects the reflection surface 22a, P be a point on the reflection surface 23a of the second reflection mirror 23 where the optical axis intersects the reflection surface 23a, and W be a point on the light incident surface 25a of the roof prism 25 where the optical axis intersects the light incident surface 25a. As shown in FIG. 4(a), since the shape of the triangle OPW is kept similar as long as $d_1/d_2$ is constant, the inclination of the line segment OW to the z axis is constant when the point O is fixed. In contrast, when $d_1/d_2$ changes, the inclination of the line segment OW to the z axis changes, which corresponds to a situation in which the position of the roof prism 25 with respect to the first reflection mirror 22 shifts upward or downward in the y-axis direction. Therefore, when $d_1/d_2$ is smaller than the lower limit in the conditional expression (2), the position of the roof prism 25 is higher than the position of the first reflection mirror 22, and light that is not reflected off the first reflection mirror 22 but is directly incident on the roof prism 25 undesirably forms a stray light component, as shown in FIG. 4(b). On the other hand, when $d_1/d_2$ is greater than the upper limit in the conditional expression (2), the position of the roof prism 25 is lower than the position of the first reflection mirror 22, and the optical axis of the light reflected off the second reflection mirror 23 shifts toward the first reflection mirror 22, as shown in FIG. 4(c). In this case, part of the light reflected off the second reflection mirror 23 is incident on the first reflection mirror 22, which undesirably prevents the conditional expression (1) from being satisfied. To satisfy the conditional expression (1), it is conceivable to reduce the diameter of the light flux passing through the erecting optical system 2, which in turn undesirably lowers the f-number of the objective optical system 1. When $d_1/d_2=1$, the point W is closest to the point O, which means that the arrangement of the first and second reflection mirrors 22, 23 is minimized in the z-axis direction. Further, when the diameter of the opening of each of the first aperture 21 and the second aperture 24 is too large, light that is not reflected off the first reflection mirror 22 or the second reflection mirror 23 but is directly incident on the roof prism 25 undesirably forms a stray light component. The diameter of the opening of each of the first and second apertures 21, 24 is therefore desirably minimized.

Further, to allow the telescopic optical system 10 according to the present embodiment to satisfy the conditional expression (1) and reduce the size thereof, the telescopic optical system 10 desirably satisfies the following conditional expression (3), in which $f_0$ represents the focal length of the objective optical system 1.

[Expression 9]

$$\frac{1}{4}f_o < d_1 + d_2 < \frac{3}{4}f_0 \qquad (3)$$

When $d_1+d_2$ is smaller than the lower limit in the conditional expression (3), the size of a light flux that can be introduced through the light incident surface 25a of the roof prism 25 decreases, resulting in insufficient brightness. The conditional expression (1) is also not satisfied. On the other hand, When $d_1+d_2$ is greater than the upper limit in the conditional expression (3), the erecting optical system 2 enlarges in the y-axis direction, which does not allow reduction in the size of the telescopic optical system 10. In view of the facts described above, in the erecting optical system 2, the spacing $d_1$ along the optical axis between the reflection surface 22a of the first reflection mirror 22 and the reflection surface 23a of the second reflection mirror 23 and the spacing $d_2$ along the optical axis between the reflection surface 23a of the second reflection mirror 23 and the light incident surface 25a of the roof prism 25 are desirably so determined that the conditional expressions (2) and (3) described above are satisfied.

Further, in the telescopic optical system 10 according to the present embodiment, the distance d along the optical axis from a principal plane of the objective optical system 1 to the reflection surface 22a of the first reflection mirror 22 desirably satisfies the following conditional expression (4).

[Expression 10]

$$z_0-(d_1+d_2)<d<z_0 \quad (4)$$

Figure 5:
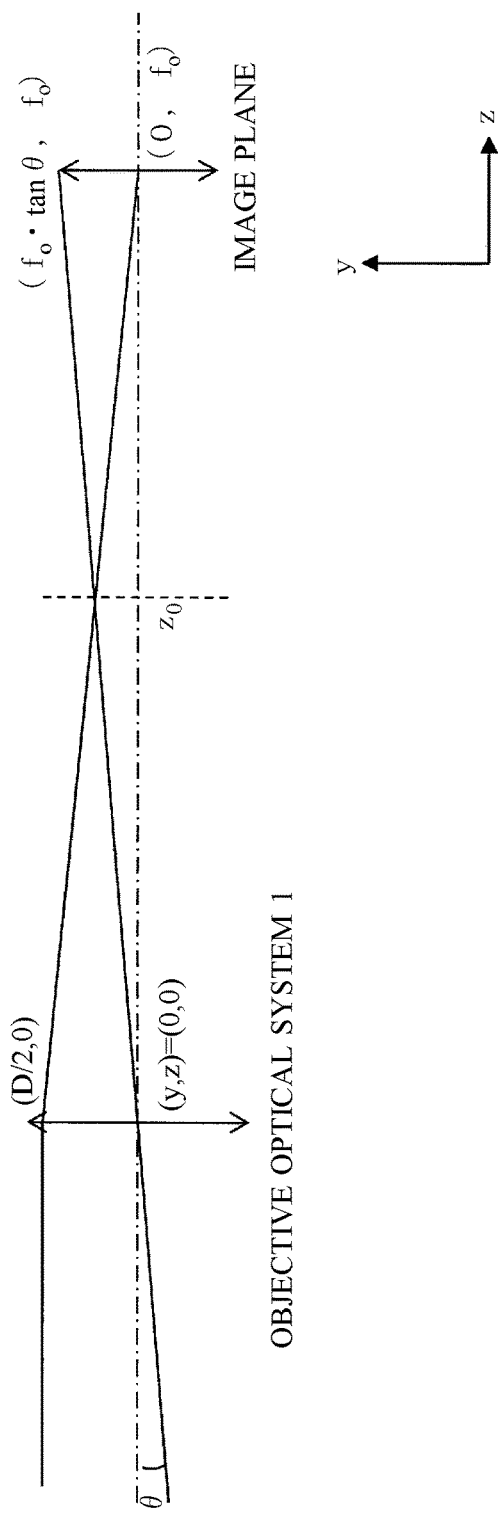
FIG. 5 is a descriptive diagram showing the relationship between a ray that passes through an objective optical system and corresponds to a maximum numerical aperture and a ray that passes through the center of the objective optical system and corresponds to a maximum angle of view.

FIG. 5 shows a state in which the optical axis of the telescopic optical system 10 is unfolded in a yz plane and also shows the positional relationship between the principal plane of the objective optical system 1 and an image plane on which the objective optical system 1 forms an image. In FIG. 5, D represents the aperture diameter of the objective optical system 1, and 2θ represents an actual field of view or a maximum angle of view of the telescopic optical system 10. In FIG. 5, the position where the optical axis intersects the principal plane of the objective optical system 1 is assumed to be an origin (y, z)=(0, 0), and the positive z-axis direction with respect to the origin is defined to be the direction in which an image is formed. Based on the above definitions, the position of a principal ray corresponding to a maximum numerical aperture in the objective optical system 1 (a ray that determines the contour of the pupil and enters the objective optical system 1 substantially in parallel to the optical axis) is (D/2, 0), the position on the image plane of the objective optical system 1 where the optical axis interests the image plane is (0, $f_o$), and the position at a maximum image height is ($f_o$·tan θ, $f_o$). Further, $z_0$ in the conditional expression (4) described above corresponds to the z-axis coordinate of a point of intersection of a ray that corresponds to the maximum angle of view and passes through the center of the objective optical system 1 and the ray that determines the contour of the pupil described above. The z-axis coordinate $z_0$ is expressed by the following expression (c). Further, let d3 be the distance along the optical axis from the vertex of the surface closest to the image side in the objective optical system 1 to the reflection surface 22a of the first reflection mirror 22. In the configuration of the objective optical system 1, d can approximate to d3.

[Expression 11]

$$z_0 = \frac{D}{2\tan(\theta) + \dfrac{D}{f_o}} \quad (c)$$

When the distance d along the optical axis from the principal plane of the objective optical system 1 to the reflection surface 22a of the first reflection mirror 22 is greater than the upper limit in the conditional expression (4), the size of the roof prism 25 increases, which is not preferable because the size of the telescopic optical system 10 cannot be reduced.

Figures 6A, 6B:
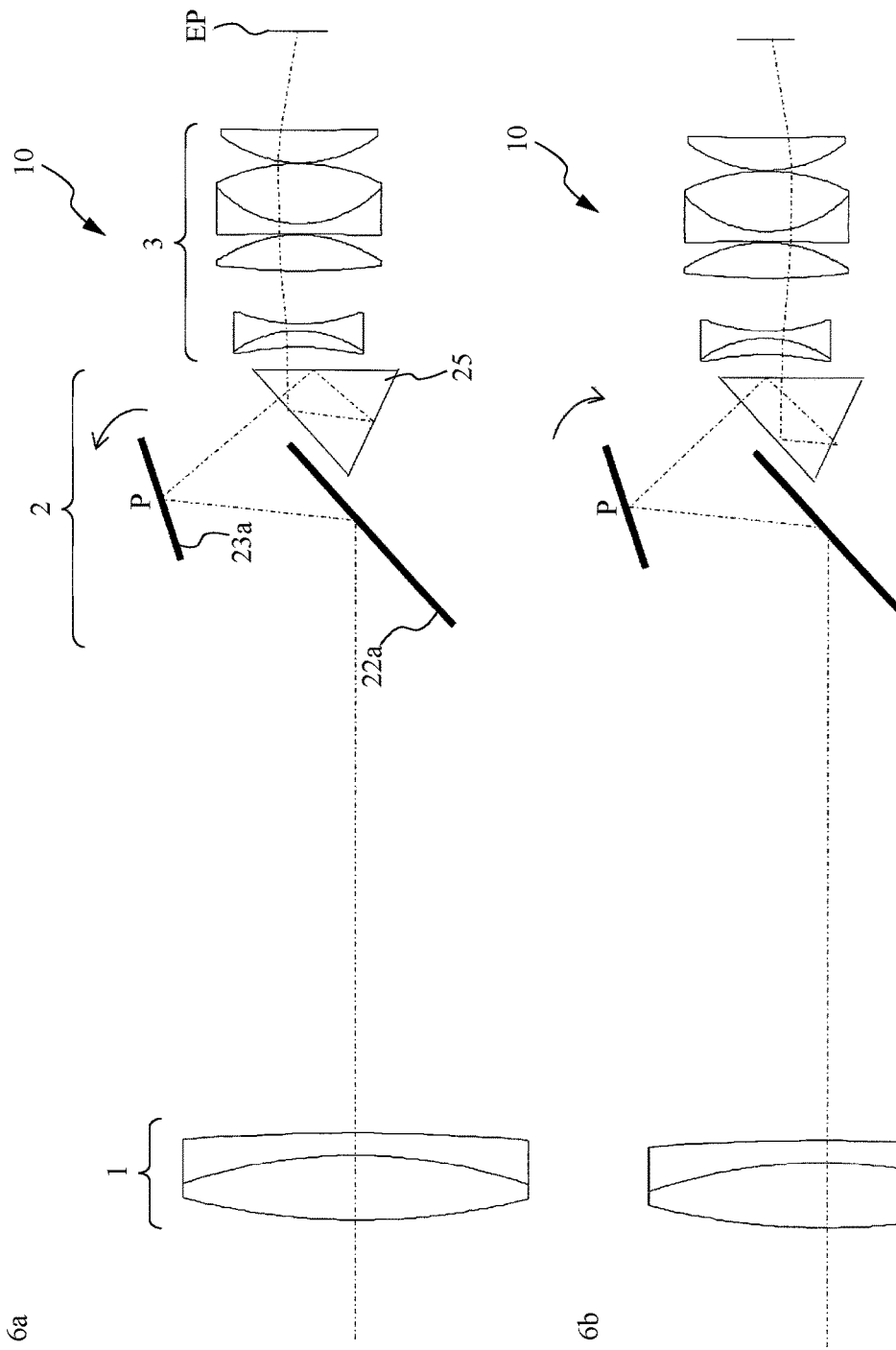
FIG. 6 is a descriptive diagram for describing how the state of a ray changes when the second reflection mirror is rotated, FIG. 6(a) showing a case where the second reflection mirror is rotated counterclockwise, and FIG. 6(b) showing a case where the second reflection mirror is rotated clockwise.

FIG. 6 shows a configuration in which the second reflection mirror 23 is rotated around a point of intersection P between the optical axis and the second reflection mirror 23 for an additional anti-vibration function. An anti-vibration function is typically provided by decentering a lens, but in the telescopic optical system 10 according to the present embodiment, the second reflection mirror 23, which is a reflection member, is used to achieve anti-vibration, because the telescopic optical system 10 according to the present embodiment is a reflection-based optical system. Inclining the second reflection mirror 23 by an angle δ results in a deflection angle of 2δ, more greatly affecting a ray than in a case where a lens is used. That is, to achieve a sufficient anti-vibration function, a smaller amount of change suffices. As another advantageous effect, an extra space necessary to decenter a lens can therefore be reduced. The second reflection mirror 23 is desirably allowed to rotate in the following two directions: rotation around the x axis at the point P as the center of rotation; and rotation around to the z axis at the point P as the center of rotation. However, an optical apparatus supported by a hand, such as binoculars, only the rotation around the x axis described above may be provided because anti-vibration in upward and downward directions is important. Further, instead of rotating the second reflection mirror 23, rotating the first reflection mirror 22 can also provide the anti-vibration function.

Figure 7:
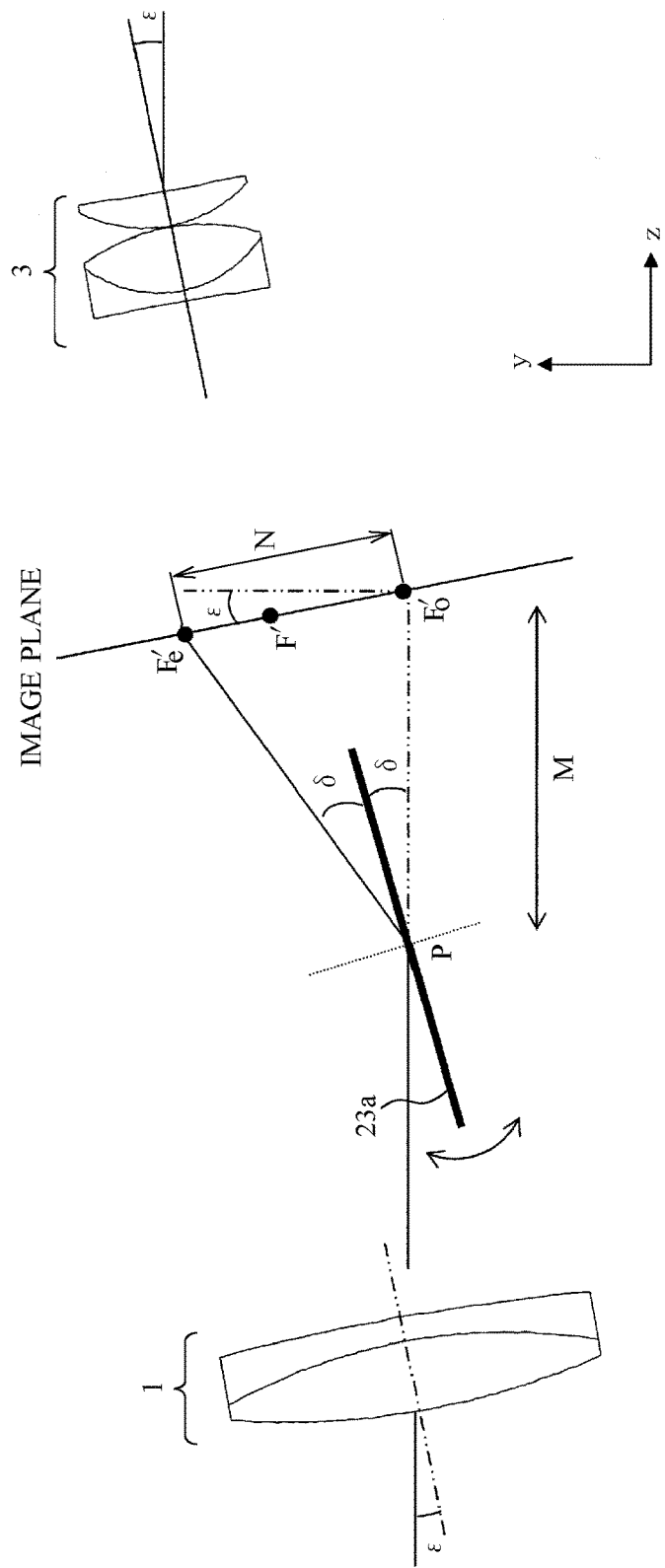
FIG. 7 is a descriptive diagram for describing how the state in an image plane changes when the telescopic optical system is inclined.

FIG. 7 shows a state in which the telescopic optical system 10 according to the present embodiment is inclined and the erecting optical system 2 is unfolded along a straight line (in FIG. 7, the erecting optical system 2 is representatively formed only of the second reflection mirror 23). It is assumed that in a reference state (before the telescopic optical system 10 is inclined), the optical axis passes through the position F' in the objective optical system 1. When the telescopic optical system 10 is inclined by an angle ε to the optical axis in the reference state, the objective optical system 1 is also inclined by the angle ε, whereby the optical axis on the object side is shifted from F' to $F_0$' in the image plane. Since the ocular optical system 3 is similarly inclined by the angle ε, the optical axis on the ocular side is shifted from F' to $F_e$' in the image plane. As a result, the total amount of shift of the optical axis N, which needs to be corrected, is the sum of the length F'$F_0$' and the length F'$F_e$' in the image plane. The total amount of shift of the optical axis N is expressed by the following expression (d), in which $f_e$ is the focal length of the ocular optical system 3.

[Expression 12]

$$N=(f_o-f_e)\cdot\tan \varepsilon \quad (d)$$

Although not shown in FIG. 7, when image inversion occurs in a portion between the objective optical system 1 and the image plane, the sign of the amount of shift of the optical axis on the ocular side changes, which means that the total amount of shift of the optical axis N is the difference between the length F'F$_0$' and the length F'F$_e$' in the image plane. Further, in FIG. 7, assuming that the inclination ε is very small, the amount of rotation δ of the second reflection mirror 23 is expressed based on the triangle PF$_e$'F$_0$' by the following expression (e), in which M represents the distance along the optical axis from the center of rotation P to the image plane of the objective optical system 1.

[Expression 13]

$$\delta = \frac{1}{2}\tan^{-1}\left(\frac{N}{M}\right) \quad (e)$$

Further, an acceptable range of the total amount of shift of the optical axis N plus ΔN is expressed by the following expression (f), in which ΔN is ±f$_e$ tan ε.

[Expression 14]

$$N - f_e \tan \varepsilon < N + \Delta N < N + f_e \tan \varepsilon \quad (f)$$

In view of the considerations described above, the amount of rotation of the second reflection mirror 23 desirably satisfies the following conditional expression (5).

[Expression 15]

$$\frac{1}{2}\tan^{-1}\left(\frac{f_o - 2f_e}{M}\tan\varepsilon\right) < \delta < \frac{1}{2}\tan^{-1}\left(\frac{f_o}{M}\tan\varepsilon\right) \quad (5)$$

When δ is smaller than the lower limit in the conditional expression (5), undercorrection undesirably occurs. On the other hand, when δ is greater than the upper limit in the conditional expression (5), overcorrection undesirably occurs.

EXAMPLE

An example of the telescopic optical system 10 will be described with reference to FIG. 1. The telescopic optical system 10 includes the objective optical system 1, the erecting optical system 2, and the ocular optical system 3 sequentially arranged from the object side. The objective optical system 1 includes a cemented lens formed of a biconvex lens L1 and a negative meniscus lens L2 having a concave surface facing the object side sequentially arranged from the object side and cemented to each other. The erecting optical system 2 includes the first aperture 21, the first reflection mirror 22, the second reflection mirror 23, the second aperture 24, and the roof prism 25 sequentially arranged from the object side. The ocular optical system 3 includes the following lenses sequentially arranged from the object side: a cemented lens formed of a positive meniscus lens L3 having a concave surface facing the object side and a biconcave lens L4 cemented to each other; a biconvex lens L5; a cemented lens formed of a biconcave lens L6 and a biconvex lens L7 cemented to each other; and a positive meniscus lens L8 having a convex surface facing the object side. An image plane IM of the objective optical system 1 is formed in a position between the biconcave lens L4 and the biconvex lens L5 in the ocular optical system 3. In the telescopic optical system 10 shown in FIG. 1, the optical axis of the ocular optical system 3 is offset from the optical axis of the objective optical system 1 in the y-axis direction, and the amount of offset is 8.779 mm, as clearly shown in the following Table 1.

The following Table 1 shows specification values of the telescopic optical system 10 according to the present embodiment. In Table 1, in the overall specification section, f$_0$ represents the focal length of the objective optical system 1; f$_e$ represents the focal length of the ocular optical system; ER represents an eye relief (distance along optical axis from closest image-side lens surface of ocular optical system 3 (twentieth surface in FIG. 1) to eye point EP); and β represents the magnification of the telescopic optical system 10. In the lens data section, the first column m shows the number (surface number) of each optical surface numbered from the object side; the second column r shows the radius of curvature of each optical surface; the third column d shows the distance along the optical axis from each optical surface to the following optical surface (intersurface spacing); the fourth column nC shows the refractive index at the C line (λ=656.3 nm); the fifth column nd shows the refractive index at the d line (λ=587.6 nm); the sixth column nF shows the refractive index at the F line (λ=486.1 nm); the seventh field y shows the y coordinate of a point where the optical axis intersects each optical surface; and the eighth field z shows the z coordinate of a point where the optical axis intersects each optical surface. The y and z coordinates are measured from the first surface as the origin. The refractive index of air is 1.000000 but omitted in Table 1. Further, the y and z coordinates are available only for the objective optical system 1 and the erecting optical system 2.

An aspheric surface is expressed by the following aspheric surface expression (g), in which y represents the height in the direction perpendicular to the optical axis, S(y) represents the distance along the optical axis from a tangential plane at the vertex of the lens to the position on the surface of the lens at the height y (sag amount), R represents the radius of curvature (paraxial radius of curvature of a reference spherical surface), κ represents a conical constant, and An represents an n-th aspheric coefficient. In Table 1, * is placed to the right of a surface number of an aspheric optical surface. Further, an aspheric surface in the telescopic optical system 10 according to the present example has aspheric coefficients that are all zero, and the aspheric surface data section therefore shows the surface number and the conical constant κ of the aspheric surface.

[Expression 16]

$$S(y) = \frac{y^2/R}{1 + \sqrt{1 - (1+\kappa)y^2/R^2}} + A4 \cdot y^4 + A6 \cdot y^6 + A8 \cdot y^8 + A10 \cdot y^{10} \quad (g)$$

The following Table 1 further shows values compliant with the conditional expressions (1) to (5) described above, that is, condition compliant values. The symbols in the condition compliant value section have been described above.

All the following specification values of the focal length f, the radius of curvature r, the intersurface spacing d, and other lengths are typically expressed in the unit "mm" but not necessarily because an optical system provides comparable optical performance even when the optical system is proportionally enlarged or reduced.

TABLE 1

[Overall specification values]

$f_o = 190.00$
$f_e = 12.65$
ER = 15.281
$\beta = 15x$

[Lens data]

| M | r | d | nC | nd | nF | y | z |
|---|---|---|---|---|---|---|---|
| 1' | 108.000 | 10.0 | 1.514319 | 1.516789 | 1.522369 | 0.000 | 0.000 |
| 2' | −80.000 | 3.5 | 1.615023 | 1.620040 | 1.632103 | 0.000 | 10.000 |
| 3' | −344.799 | 94.5 | | | | 0.000 | 13.500 |
| 4 | ∞ | 30.4 | | | | 0.000 | 107.967 |
| 5 | ∞ | 24.0 | | | | 30.254 | 111.147 |
| 6 | ∞ | 5.9 | 1.514319 | 1.516789 | 1.522369 | 12.433 | 127.192 |
| 7 | ∞ | 13.7 | 1.514319 | 1.516789 | 1.522369 | 8.059 | 131.131 |
| 8 | ∞ | 10.9 | 1.514319 | 1.516789 | 1.522369 | −2.091 | 121.992 |
| 9 | ∞ | 8.0 | 1.514319 | 1.516789 | 1.522369 | 8.779 | 123.134 |
| 10' | ∞ | 3.5 | | | | 8.779 | 139.456 |
| 11 | −41.000 | 2.5 | 1.615023 | 1.620040 | 1.632103 | | |
| 12 | −17.000 | 1.2 | 1.514319 | 1.516789 | 1.522369 | | |
| 13 | 26.000 | 3.0 | | | | | |
| 14 | ∞ | 5.2 | | | | | |
| 15 | 106.761 | 5.5 | 1.489204 | 1.491755 | 1.497760 | | |
| 16* | −19.800 | 0.2 | | | | | |
| 17 | −200.000 | 1.5 | 1.796110 | 1.805184 | 1.827729 | | |
| 18 | 17.000 | 9.2 | 1.708979 | 1.713000 | 1.722197 | | |
| 19 | −28.167 | 0.2 | | | | | |
| 20 | 19.456 | 5.0 | 1.708979 | 1.713000 | 1.722197 | | |
| 21 | 300.000 | ER | | | | | |

[Aspheric surface data]

Sixteenth surface $\kappa = -1$

[Condition compliant values]

$\Phi_1 = 35.8$
$\Phi_2 = 8.96$
$\alpha = 42°$
L = 34
$d_1 = 30.420$
$d_2 = 23.980$
$z_0 = 147.063$
D = 50.0
$\theta = 2.2°$
M = 57.668
N = 1.548
$\varepsilon = 0.5°$
(1) $(\Phi_1 + \Phi_2) \cdot \cos\alpha = 33.26$
(2) $d_1/d_2 = 1.269$
(3) $d_1 + d_2 = 54.400$ f/4 = 47.5 3f/4 = 142.5
(4) d = 94.467 (d3 = 101.9) Lower limit = 92.663 Upper limit = 147.063
(5) $\delta = 0.769$ Upper limit = 0.823 Lower limit = 0.714

Table 1 shows that the telescopic optical system 10 according to the present example satisfies all the conditional expressions (1) to (5) described above. As described above, even when the distance d from the principal surface of the objective optical system 1 to the reflection surface 22a of the first reflection mirror 22 is caused to approximate to the distance d3 along the optical axis from the vertex of the closest image-side surface in the objective optical system 1 to the reflection surface 22a of the first reflection mirror 22, the telescopic optical system 10 according to the present example satisfies the conditional expression (4).

REFERENCE SIGNS LIST

1 Objective optical system
2 Erecting optical system
3 Ocular optical system
10 Telescopic optical system
22 First reflection mirror (first reflection member)
23 Second reflection mirror (second reflection member)
25 Roof prism
25a Light incident surface
25b Light exiting surface

The invention claimed is:
1. A telescopic optical system characterized in that the telescopic optical system comprises the following optical systems arranged from an object side:
   an objective optical system that forms an image in an image plane; and
   an erecting optical system that erects an image formed by the objective optical system, and
   the erecting optical system includes
   a first optical part including a first reflection member having a reflection surface that reflects light from the objective optical system, and a second reflection member being spaced apart from the first reflection member and having a reflection surface that reflects the light reflected off the first reflection member, and a third reflection member that causes a light reflected off the second reflection member to be incident through a light incident surface, to be reflected off reflection surfaces, and then to exit through a light exiting surface, wherein a part of the first reflection member is interposed between the second reflection member and the third reflection member, and wherein the third reflection member is a prism and the incident surface of the third reflection member occupies only a first portion of the incident surface of the prism, and a second portion of the incident surface is covered by the part of the first reflection member and is thus blocked from receiving light from the objective optical system, characterized in that a condition defined by the following expression is satisfied:

$$0.5 < \frac{d_1}{d_2} < 2$$

$$\frac{1}{4} f_o < d_1 + d_2 < \frac{3}{4} f_o$$

where $f_o$ represents a focal length of the objective optical system, $d_1$ represents a distance along an optical axis from the reflection surface of the first reflection member to the reflection surface of the second reflection member, and $d_2$ represents a distance along the optical axis from the reflection surface of the second reflection member to the light incident surface of the third reflection member.

2. The telescopic optical system according to claim 1, characterized in that the third reflection member is a glass prism.

3. The telescopic optical system according to claim 1, characterized in that the second reflection member is arranged outside a first area disposed between a light incident surface of the first reflection member and a light exiting surface of the objective optical system, light to be made incident on the light incident surface of the first reflection member passing through the first area.

4. The telescopic optical system according to claim 3, characterized in that the first reflection member is arranged outside a second area interposed between the second reflection member and a light incident area of the light incident surface of the third reflection member, light to be made incident on the light incident surface of the third reflection member passing through the second area.

5. The telescopic optical system according to claim 1, characterized in that a condition defined by the following expression is satisfied:

$$(\Phi_1 + \Phi_2) \cdot \cos \alpha < L$$

where $\Phi_1$ represents an effective diameter of the first reflection member, specifically, an effective diameter thereof in a longitudinal direction, $\Phi_2$ represents an effective diameter of the light incident surface of the third reflection member, $\alpha$ represents an angle that the reflection surface of the first reflection member forms with an optical axis, and L represents a spacing between an end of the reflection surface of the first reflection member that faces the objective optical system and the light exiting surface of the third reflection member.

6. An apparatus characterized in that the apparatus comprises the telescopic optical system according to claim 1.

7. A telescopic optical system characterized in that telescopic optical system comprises the following optical systems arranged from an object side:

an objective optical system; and an erecting optical system that erects an image formed by the objective optical system, and the erecting optical system includes a first reflection member constituted by a first mirror having a reflection surface that reflects light from the objective optical system, a second reflection member constituted by a second mirror separated from the first mirror by open space and having a reflection surface that reflects the light reflected off the first reflection member, and a third reflection member that has at least three surfaces including at least one roof surface, uses one of the surfaces as a light incident surface and another one of the surfaces as a light exiting surface, and causes the light reflected off the second reflection member to be incident through the light incident surface, to be reflected off the surfaces, and then to exit through the light exiting surface, the first mirror being disposed at a first angle relative to a line parallel to the optical axis of the objective optical system, and the second mirror being disposed at a second angle, smaller than the first angle, relative to a line parallel to the optical axis of the objective optical system, both angles opening in a direction away from the objective optical system and toward the erecting optical system and the first angle and the second angle being acute angles, and characterized in that the effective reflection surface of the first mirror is larger than the effective reflection surface of the second mirror, and the mirrors are disposed so that light reflected from the second mirror is not blocked by the first mirror, and the second mirror causes the light reflected off the first mirror to be reflected only to a region that is outside of an extremity of the first mirror, and characterized in that the third reflection member is a prism and the incident surface of the third reflection member occupies only a first portion of a prism surface, and a second portion of the prism surface is covered by part of the first mirror and is thus blocked from receiving light from the objective optical system, characterized in that a condition defined by the following expression is satisfied:

$$z_0 - (d_1 + d_2) < d < z_0$$

where D represents an aperture diameter of the objective optical system, $2\theta$ represents a maximum angle of view of the objective optical system, $f_0$ represents a focal length of the objective optical system, d represents a distance along an optical axis from a principal plane of the objective optical system to the reflection surface of the first reflection member, $d_1$ represents a distance along the optical axis from the reflection surface of the first reflection member to the reflection surface of the second reflection member, and $d_2$ represents a distance along the optical axis from the reflection surface of the second reflection member to the light incident surface of the third reflection member, and $z_0$ is expressed by the following expression $$z_0 = \frac{D}{2\tan(\theta) + \frac{D}{f_o}}.$$

8. The telescopic optical system according to claim 7, wherein
the first reflection member and the second reflection member are formed of a material lighter than a glass prism, and wherein
at least a part of the first reflection member is interposed between the second reflection member and the third reflection member.

9. The telescopic optical system according to claim 7, characterized in that
the third reflection member is a glass prism.

10. The telescopic optical system according to claim 7, characterized in that
a condition defined by the following expression is satisfied:

$$(\Phi_1 + \Phi_2) \cdot \cos \alpha < L$$

where $\Phi_1$ represents an effective diameter of the first reflection member, specifically, an effective diameter thereof in a longitudinal direction, $\Phi_2$ represents an effective diameter of the light incident surface of the third reflection member, $\alpha$ represents an angle that the reflection surface of the first reflection member forms with an optical axis, and L represents a spacing between an end of the reflection surface of the first reflection member that faces the objective optical system and the light exiting surface of the third reflection member.

11. The telescopic optical system according to claim 7, characterized in that
a condition defined by the following expression is satisfied:

$$0.5 < \frac{d_1}{d_2} < 2$$

$$\frac{1}{4} f_o < d_1 + d_2 < \frac{3}{4} f_o$$

where $f_0$ represents a focal length of the objective optical system, $d_1$ represents a distance along an optical axis from the reflection surface of the first reflection member to the reflection surface of the second reflection member, and $d_2$ represents a distance along the optical axis from the reflection surface of the second reflection member to the light incident surface of the third reflection member.

12. The telescopic optical system according to claim 7, characterized in that a vibration-correction mechanism includes one of the first reflection member and the second reflection member that rotates around a center of rotation including an optical axis.

13. The telescopic optical system according to claim 12, characterized in that the telescopic optical system further comprises an ocular optical system for observation of the image formed by the telescopic optical system, and
a condition defined by the following expression is satisfied:

$$\frac{1}{2}\tan^{-1}\left(\frac{f_0 - 2f_e}{M}\tan\varepsilon\right) < \delta < \frac{1}{2}\tan^{-1}\left(\frac{f_o}{M}\tan\varepsilon\right)$$

where M represents a distance along the optical axis from the center of rotation of the first reflection member or the second reflection member to the image formed by the objective optical system, $f_0$ represents a focal length of the objective optical system, $f_e$ represents a focal length of the ocular optical system, $\varepsilon$ represents inclination of the entire telescopic optical system to the optical axis in a reference state, and $\delta$ represents an angle of rotation of the first reflection member or the second reflection member.

14. The telescopic optical system according to claim 13, characterized in that an optical axis of the objective optical system and an optical axis of the ocular optical system are not present along a single straight line.

15. An apparatus characterized in that the apparatus comprises the telescopic optical system according to claim 7.

16. The telescopic optical system according to claim 7, characterized in that the telescopic optical system further comprises an ocular optical system for observation of the image formed by the telescopic optical system and in that an optical axis of the ocular optical system is parallel to the optical axis of the objective optical system, and the optical axis of the ocular optical system extends through the open space between the first mirror and the second mirror.

* * * * *